Patented Oct. 5, 1948

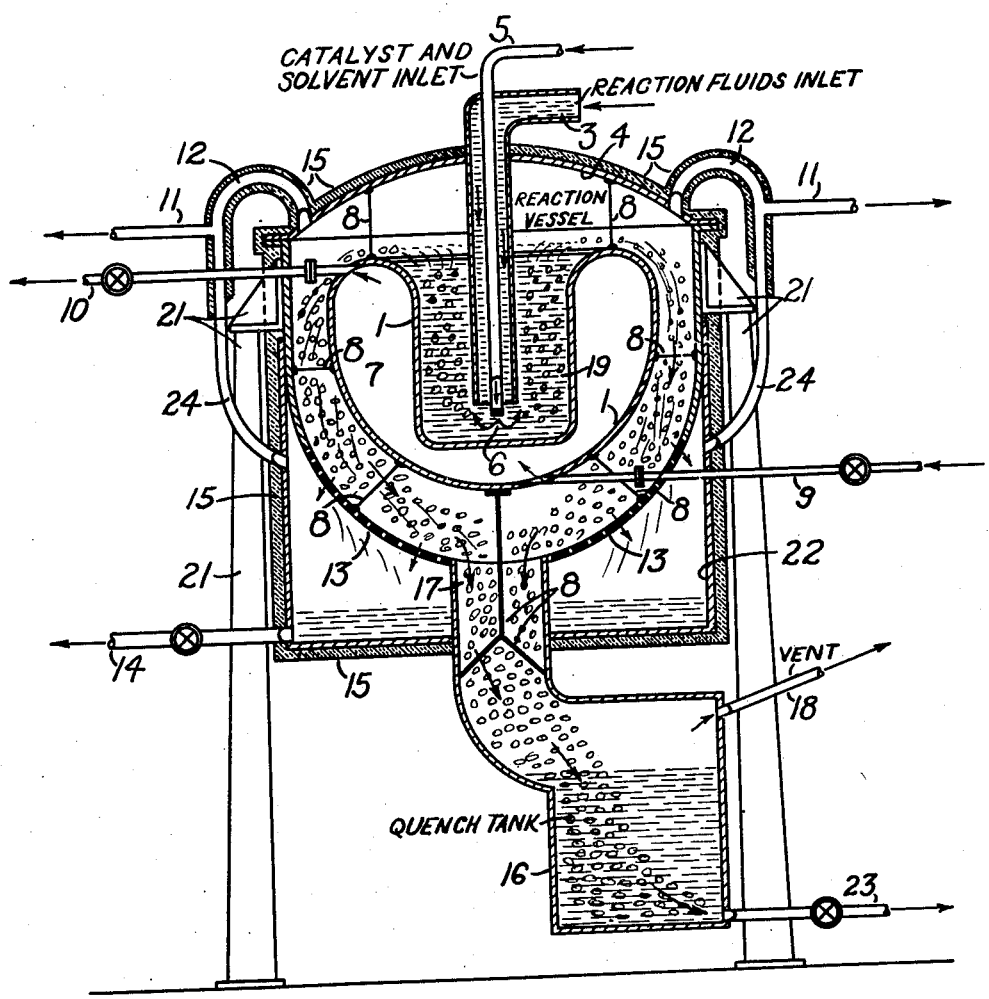

2,450,547

UNITED STATES PATENT OFFICE 2,450,547

CONTINUOUS PROCESS FOR MAKING SOLID POLYMER

Peter J. Gaylor, Union County, N. J.

Original application December 8, 1941, Serial No. 422,137. Divided and this application May 6, 1944, Serial No. 534,445

4 Claims. (Cl. 260—93)

This invention relates to chemical reactions in which liquid raw materials are converted to solids at the reaction conditions. It deals especially with a polymerization process for carrying out continuously the polymerization of unsaturated organic materials particularly at low temperatures.

At the present time there is no totally satisfactory method for the continuous polymerization of unsaturated materials to solid products. Various unsaturated mixtures have been polymerized in the past by batch methods into very high molecular weight substances in reaction vessels or containers of the batch type. In such batch type reactors, the polymerization of the various unsaturated compounds is carried out, for example, at low temperatures by the use of active halides or Friedel-Crafts type catalysts. This is particularly the case with isobutylene at temperatures ranging from 0° C. to −100° C., under the influence of catalysts such as boron fluoride in the presence of diluent-refrigerants such as liquid propane, liquid ethane, liquid ethylene and the like. They have also been applied to the polymerization of olefinic mixtures such as iso-olefins of the type of isobutylene in admixture with diolefins such as butadiene, isoprene, pentadiene, dimethyl butadiene and the like, in the presence of similar diluent-refrigerants, employing a Friedel-Crafts type catalyst such as $AlCl_3$ dissolved in a low freezing solvent such as ethyl chloride, methyl chloride, carbon disulfide or the like.

In using the batch reactors of the prior art, considerable difficulty has been experienced in that the formed polymer particles or slurry had a tendency to coalesce and lump on the reactor walls into large aggregates which necessitated the cleaning of the reaction vessel at the end of about every second batch in order to remove the clumped polymer particles, particularly the lumped polymer particles on the side walls of the reaction vessel, so as not to impede the agitating means in subsequent batch operations. Furthermore, in batch operations poisons tended to accumulate during the polymerization resulting in the formation of soft lower molecular weight products which, due to their sticky nature, gave operating difficulties of considerable magnitude. Moreover, the polymer formed tended to build up on the wall either below or above the liquid level of the reaction vessel or on the impeller arm above the liquid mixture level thereby necessitating frequent shutdowns in order to remove the adhering polymer masses and prepare the reaction vessel for subsequent polymerization reactions.

An object of the present invention is to provide a continuous polymerization apparatus for the rapid manufacture of polymers with minimum agglomeration in the reaction vessel, and minimum loss of refrigerant and solvent employed. Other objects will become apparent as the description proceeds.

The objects of my invention are accomplished by passing the catalyst and solvent together or separately, together with or separate from the reactant or reactants, into a reaction zone, the reaction ingredients causing a swirling action so as to dispense with agitation, although agitation may be employed. The proper time of reaction is maintained by regulating the speed of the materials through the reaction zone.

I have found that by means of the device of the present invention, desirable high molecular weight polymers and interpolymers, particularly those obtained at low temperatures, are formed in a fine slurry or pellet form distributed in the solvent and the unreacted liquid. I separate this solid from the liquids by passing the products immediately after reaction over a foraminous member adjacent to the reactor. Other objects and details of the invention will be apparent from the following description when read in connection with the accompanying drawing wherein is shown a semi-diagrammatic view in vertical cross-section of a polymerization reactor.

In the drawing is shown a desirable embodiment of the invention. An outer casing 4, preferably of spheroidal shape, is mounted on supports 21. The lower portion of the outer casing is in the form of a foraminous wall 13, such as a screen, perforated plate, or the like, disposed and constructed so that the reaction mixture passes over it without stoppage and the liquid and solid phases are substantially separated before the solid phase reaches the bottom of the casing at discharge opening 17 and drops into quench tank 16 which contains alcohol, water, or similar deactivating, neutralizing or hydrolyzing agent to remove or neutralize the catalyst, acid, or other similar substance used in the reaction. Vent 18 is provided at the top of the quench tank to recover any vapors given off.

Inside of the outer casing 4 and mounted therein by supports or brackets 8, is reaction vessel 1 in which the reaction takes place. This vessel is preferably of metal such as iron, stainless steel, etc., but may be of any inert material capable of withstanding the reaction conditions. It may be a shell, or it may be a hollow-walled vessel, the hollow space 7 of which may be filled with insulation or employed for introducing refrigerant or heating means, say in at pipe 9 and out at pipe 10 to effect indirect heat exchange to the reaction mixture.

The reaction mixture, e. g. the reaction liquid or liquids, are introduced through the top of outer casing 4 by means of pipe 3 into reaction zone 19. Catalyst and solvent and/or refrigerant liquid may be introduced through annular pipe 5 which terminates in the reaction zone with an orifice 6 which imparts a swirling motion to the reacting liquids. The rate of introduction of the materials through pipes 3 and 5 is controlled by the time of reaction required in reaction zone 19.

A sealed enclosure 22 is provided for collecting liquid dropping through foraminous wall 13, and vent 24 allows gases and vapors to be drawn off through outlet 11 together with those drawn off the top of the outer casing at 12 for recompression, after purification if necessary, and recycling. Liquid may be recovered from outlet 14 and this may be recirculated to the reaction zone, preferably after removal of poisons which tend to accumulate, e. g. by filtration through active charcoal, distillation, or the like. Insulation 15 is provided for the outer surfaces in order to minimize heating or refrigeration losses. Solid product, and/or quenching liquid may be drawn off recovery vessel 16 by opening 23.

In the operation of this embodiment of the invention, a suitable quantity of the refrigerant, which may be liquid propane, liquid ethane or liquid ethylene, is delivered through the supply pipe 3 to the reaction vessel 1. The reaction vessel, which is preferably steel or other metal, is cooled rapidly by volatilization of the refrigerant (aided by the cooling effect of liquid ethylene in the refrigerant jacket 7 through pipe 9), and the volatilized gas is discharged through an exit pipe 10 for condensation and recycling or other use. When the reaction vessel and other members of the device are cooled to the desired low temperature, the desired quantity of unsaturate to be polymerized, e. g. liquid isobutylene, is delivered through delivery pipe 3 to the reaction vessel and the catalyst is simultaneously delivered to the hollow shaft 5 the end of which in the reaction vessel is provided with a nozzle, say with a ¼" hole through which the catalyst, either boron fluoride or a metal halide (such as AlCl₃ dissolved in an alkyl halide), is forced under pressure through the hollow shaft at right angles to the swirling reaction mixture. The swirling action created by the downward flow of the feed mixture and sudden impact with the bottom of the reaction vessel thereby results in simultaneous mixing of the catalyst with the reacting liquid, and the rapidly churning undercurrents of the reaction mixture produced in the reactor vessel disperse the catalyst throughout the reaction mixture at an exceedingly rapid rate. The catalyst is dispersed in droplets so small or bubbles, if boron fluoride is used, that they are completely dissolved through the solution interface into the reactant mixture before the polymerization has proceeded to such an extent as to make any substantial change in the concentration of the reactant adjacent to the interface of the bubble or droplet. Under these conditions, complete polymerization generally takes place instantaneously.

The delivery of the catalyst through the hollow shaft is maintained at a proper concentration and continued until the desired polymerization rate has been obtained, at which time the rate of feed and catalyst is continuously maintained. The polymer is formed in the reaction mixture as a slurry or hard pellets and this mixture flows due to the force of the incoming reaction mixture over screen 13 which filters out the liquids, allowing the hard polymer pellets to discharge by force of gravity into a quench tank 16 containing an oxygenated organic liquid such as an alcohol, alkali or water or any other material for removing or hydrolyzing the catalyst.

By this procedure there is thus readily obtained a continuous production of a finely divided, very high molecular weight polyisobutylene. Since liquid ethylene is used as the refrigerant, giving temperatures of approximately −98° C. (ethylene alone boils at about −103° C.) and high purity isobutylene is used with boron fluoride as the catalyst, the reactor, as shown in the drawing, is capable of producing polyisobutylene having molecular weights ranging from 100,000 up to 300,000 or above, substantially free from undesirably low molecular weight sticky materials and without any tendency for polymer accumulation in any part of the reaction vessel. The polymer as formed is in the form of fine discrete particles which lend themselves very readily to subsequent treatment.

This embodiment of the invention is also particularly advantageous for the preparation of interpolymers of mixed olefins such as isobutylene with a diolefin to give materials of high molecular weight, and low unsaturation which can be cured with sulfur.

For this use, the reacting liquid feed entering through feed pipe 3 is feed continuously to the reaction vessel. When internal refrigeration is used the refrigeration jacket 7 is insulated internally with a suitable material, although additional refrigeration may be provided in this space, and the feed which may be isobutylene and a diolefin such as butadiene, isoprene, pentadiene or dimethyl butadiene in the proportion of from 80 to 99 parts of the isobutylene with 20 to 1 part of the diolefin with a sufficient quantity of ethylene usually in the ratio of 2 parts ethylene to 1 of reactants to serve as a diluent-refrigerant. To the reaction chamber 1 there is added a mixture of methyl chloride and the isoolefin-diolefin reactants in the proportion above mentioned, the methyl chloride in this case serving as a diluent, and the flow of catalyst consisting of aluminum chloride dissolved in methyl chloride to a concentration of 0.5 gram per 100 cc. is prepared and chilled to about −78° C. and discharged through feed pipe 5 at a rate of about 100 cc. per minute simultaneously with the feed-diluent mixture entering through feed line 3.

The interpolymer resulting from this polymerization, after being quenched in tank 16 to remove the catalyst and volatile unreacted materials has a relatively low iodine number and is reactive with sulfur and upon compounding and curing gives a vulcanizate which has an elastic limit and a definite tensile strength.

Thus the invention provides a compact apparatus and process by which olefins or olefin-diolefin mixtures are polymerized continuously to nonsticky products at low temperatures with minimum losses of reactants and refrigeration so that the unpolymerized liquid mixture and polymer formed will follow up the entire inner surface of the reactor wall giving it a "washing effect" and overflow to a reservoir without forming adhering clumps of polymer bodies on the wall of the reactor vessel or draw off discharge pipe.

The apparatus may be used for the polymerization of other unsaturated compounds which yield solid polymers or copolymers at reaction temperature and which contain a liquid phase after reaction, e. g. styrene, acrylates and methacrylates, acrylonitrile, ethylene, vinylidine chlorides, olefin-diolefin resins, coumarone-indene resins, and the like either where the reaction is run in the cold or hot, although the apparatus is best employed for reactions run at low temperatures.

Other reactions which may be carried out in such an apparatus are condensation reactions, dye reactions, etc.

One advantageous feature of the present invention is the fact that the whole operation may be carried out under pressure without inconvenience. In other words, pressure may be applied to the outer casing 4, and the whole reaction and separation system thus maintained under such pressure, provision being made to shut off or by-pass quench or product collecting tank 16 intermittently to remove the product.

This is a division of my copending application Serial No. 422,137, filed December 8, 1941.

While there are disclosed but a limited number of embodiments of the invention, it is possible to provide still other embodiments wihout departing from the inventor's concept herein disclosed. Other adaptations are possible within the scope of the present invention.

I claim:

1. In the continuous process for producing a dispersed solid polymer, the particles of which tend to coalesce during removal from the reactor, said polymer being obtained by polymerizing a polymerizable raw material in liquid phase at low temperature ranging from 0° C. to −100° C., with an active halide catalyst of the Friedel Crafts type and forming a discrete dispersion of solid polymer in liquid, the improvement comprising continuously screening said polymer immediately after reaction while it is still at low temperature, to separate it from the liquid.

2. In the continuous process for producing a dispersed solid polymer, the particles of which tend to coalesce during removal from the reactor, said polymer being obtained by polymerizing a polymerizable raw material in liquid phase at low temperature ranging from 0° C. to −100° C., with an active halide catalyst of the Friedel-Crafts type and forming a discrete dispersion of a solid polymer in liquid, the improvement comprising continuously screening said polymer immediately after reaction while it is still at low temperature, to separate it from the liquid, and recycling at least a portion of the liquid to the polymerization zone.

3. Process according to claim 1 in which the polymerizable raw material comprises isobutene.

4. Process according to claim 1 in which the polymerizable raw material comprises a mixture of isobutene and a diolefin.

PETER J. GAYLOR.

REFERENCES CITED

The following references are of record in the file of this patent:

UNITED STATES PATENTS

| Number | Name | Date |
| --- | --- | --- |
| 2,041,502 | Voss et al | May 19, 1936 |
| 2,276,893 | Thomas and Lightbown | Mar. 17, 1942 |
| 2,317,878 | Bannon | Apr. 27, 1943 |
| 2,322,073 | Thomas and Sparks | June 15, 1943 |
| 2,334,195 | Hopff et al. | Nov. 16, 1943 |

FOREIGN PATENTS

| Number | Country | Date |
| --- | --- | --- |
| 483,453 | Great Britain | Apr. 20, 1938 |
| 379,029 | Italy | Mar. 5, 1940 |

OTHER REFERENCES

Chemical Engineers Handbook by Perry, 2nd edition, pp. 1658 and 1659, pub. 1941 by McGraw-Hill, N. Y.